Sept. 19, 1933.                J. SNEED                    1,927,139
                            HYDRAULIC BRAKE
                        Filed Dec. 2, 1925          4 Sheets-Sheet 2
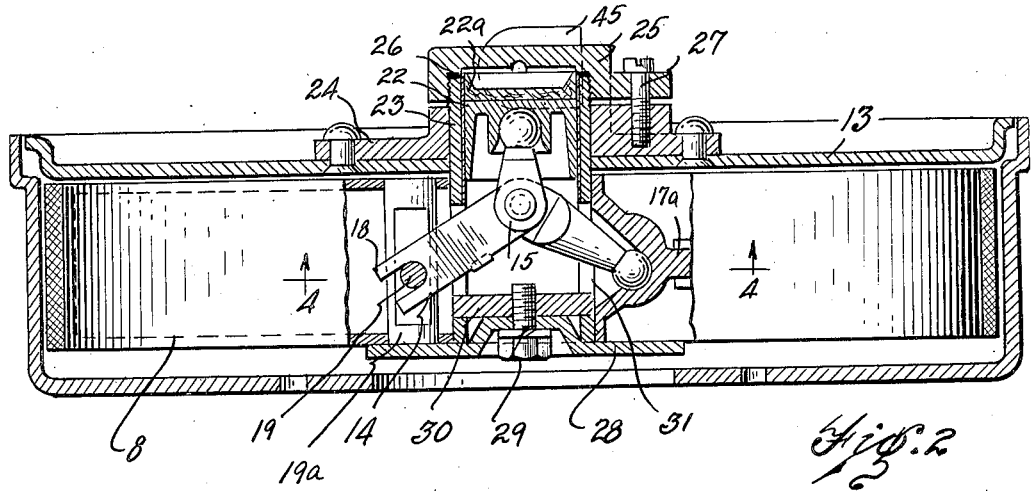
Fig. 2
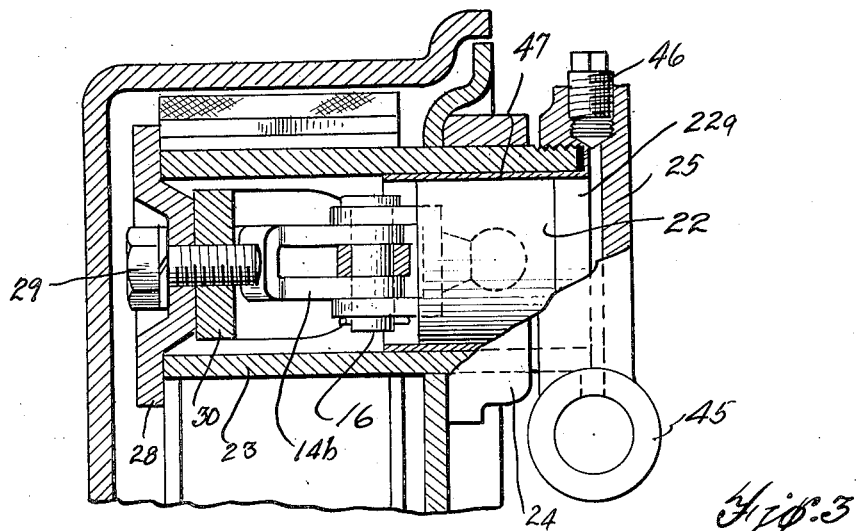
Fig. 3
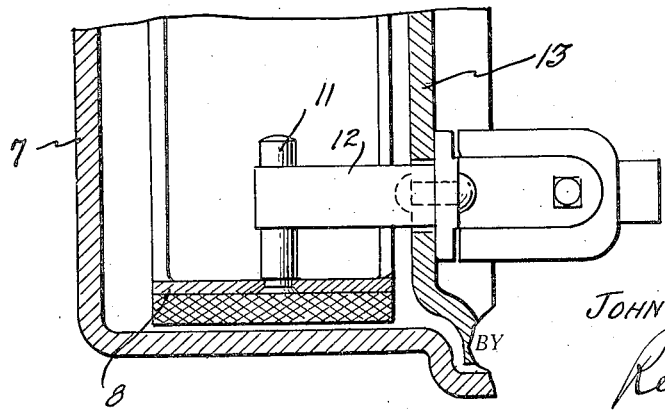
INVENTOR.
JOHN SNEED
BY Rex Frye.
ATTORNEY.

Sept. 19, 1933.　　　　J. SNEED　　　　1,927,139
HYDRAULIC BRAKE
Filed Dec. 2, 1925　　　4 Sheets-Sheet 3

INVENTOR.
JOHN SNEED
BY
Rex Frye
ATTORNEY.

Sept. 19, 1933.     J. SNEED     1,927,139
HYDRAULIC BRAKE
Filed Dec. 2, 1925     4 Sheets-Sheet 4
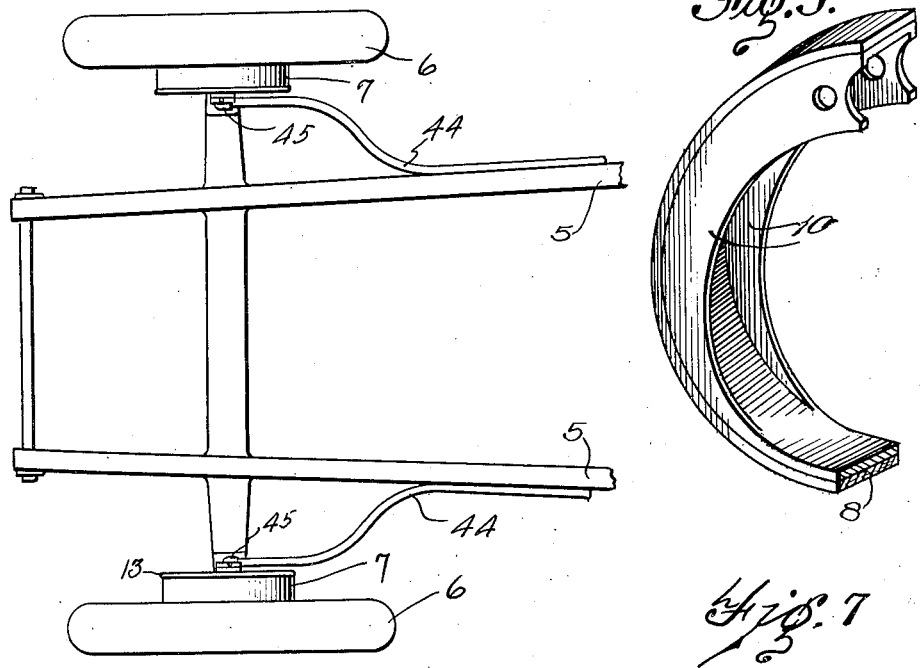
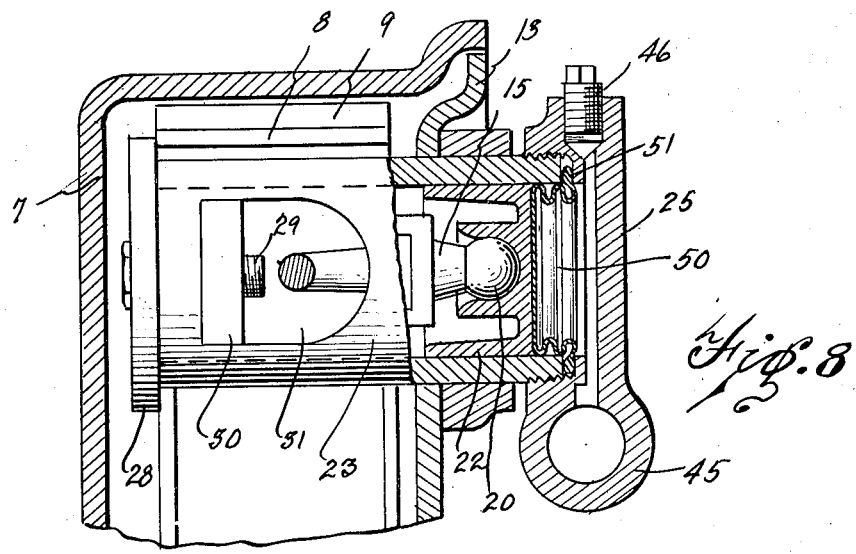
INVENTOR.
JOHN SNEED
BY Rex Frye.
ATTORNEY.

Patented Sept. 19, 1933

1,927,139

UNITED STATES PATENT OFFICE 1,927,139

HYDRAULIC BRAKE

John Sneed, Detroit, Mich., assignor to Steeldraulic Brake Corporation, Detroit, Mich., a corporation of Michigan Application December 2, 1925. Serial No. 72,670

20 Claims. (Cl. 188—152)

This invention relates to improvements in brakes for rotatable parts of automobiles and other vehicles, elevators, motors, etc., and has for its principal object the provision of simple and positively acting means for utilizing hydraulic power for actuating such brakes.

Among the objects of my invention are the provision of a brake wherein the means utilized as the anchor pin to limit the contractile movement of the brake shoe away from the brake drum is also utilized as a cylinder for the piston moved through hydraulic pressure to throw the brakes whenever desired; the mounting of the hydraulic cylinder and piston at right angles to the brake shoe; the arrangement of hydraulic cylinder and piston, toggle levers and brake shoe assembly whereby such assembly may be interchangeably used on right and left wheels, and the provision of a simple and effective brake actuating mechanism arranged to automatically transmit thrust from the piston to either end of the brake shoe according to the direction of rotation of the brake drum.

Other objects and advantages will be apparent from the following description, wherein reference is made to the accompanying drawings illustrating a preferred embodiment of my invention and wherein similar reference numerals designate similar parts throughout the several views.

In the drawings:

Fig. 2 is a horizontal sectional view taken substantially on the line 2—2 of Fig. 1.

Fig. 3 is a vertical sectional view, taken substantially on the line 3—3 of Fig. 1.

Fig. 7 is a plan view of the front of the vehicle chassis with two wheels in position thereon, and showing the manner of connecting the hydraulic actuating mechanism mounted upon the chassis with the brake, and Fig. 8 is a vertical sectional view, showing a slightly modified arrangement of the manner of operating the pistons.

Fig. 9 is a perspective view showing the rigid half of the brake shoe.

Figure 1:
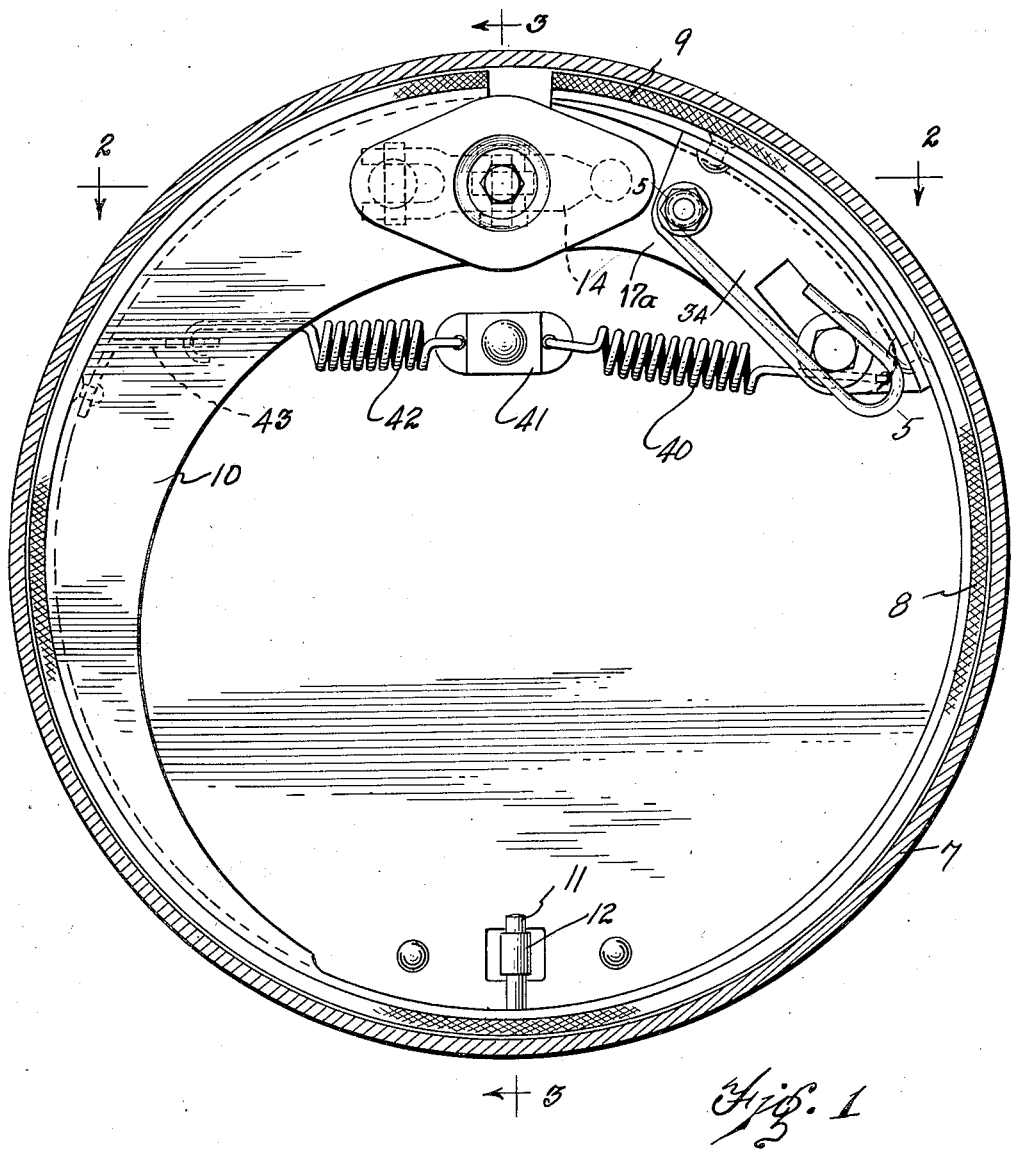
Fig. 1 is a central vertical sectional view through one of the brakes, the brake shoe being shown in normal position.
Figure 4:
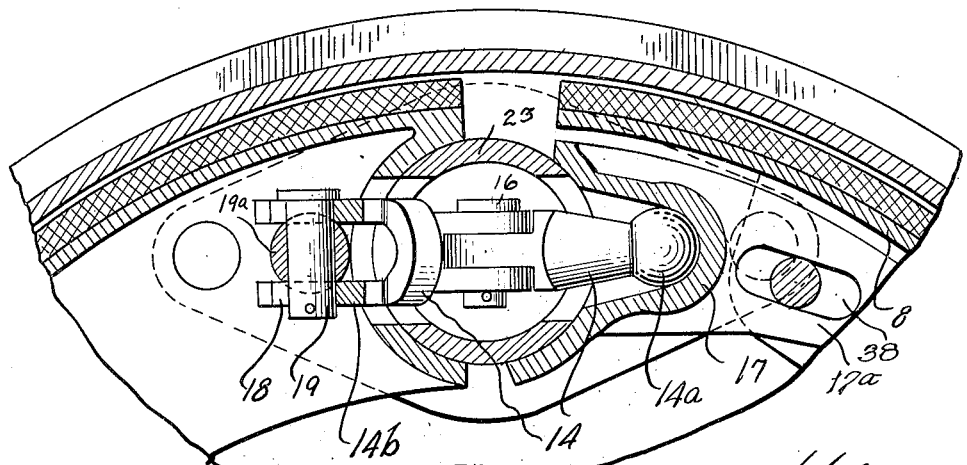
Fig. 4 is an enlarged detail view taken substantially on the line 4—4 of Fig. 2.

Referring now to the drawings, the numeral 5 designates a chassis of any desired shape or size equipped with wheels 6 of the usual or any desired type. Since the chassis and the wheels themselves form only an incidental relation to the claimed disclosure herein, no attempt has been made to illustrate and describe an operative driving and steering mechanism for the wheels 6, it being understood that the showing herein is only for purposes of exemplification of the manner of mounting the brakes and the actuating mechanism therefor.

Each brake drum 7 is suitably secured to a wheel 6 in any desired manner, and houses a brake shoe 8 so that the lining 9 thereof is adapted to engage the inner periphery of the brake drum whenever the brake actuating mechanism is operated to set the brakes. As best shown in Fig. 1 each brake shoe is formed as a divided ring open adjacent its uppermost point and having one portion, as for example its front half, of flexible material and its remaining portion braced by means of radial strengthening ribs 10 so that it is substantially rigid.

As best shown in Figures 1, 2 and 9, the substantially rigid portion of the brake shoe is channeled or of substantially U-shape in cross section, the ribs or flanges 10 being inbent at each side of the lining supporting part of the shoe and gradually decreasing in depth from the end of the shoe. A pin 11 extends radially inward from the brake shoe at substantially its lowermost portion, and a leaf spring 12 has one extremity encircling the radial pin 11 and its opposite extremity secured to the face plate 13 substantially covering the brake mechanism at the open side of the brake drum 7, so that the leaf spring may cushion and limit the movement of the brake shoe relatively to the brake drum. Such a brake shoe, as well as one form of brake actuating mechanism for operating same has been described and claimed in my companion application, Serial No. 2,715, filed January 16, 1925, and is illustrated herein to exemplify the best use now known for the brake actuating mechanism forming the claimed disclosure herein. Each brake shoe 8 is adapted to be expanded outwardly into engagement with the brake drum 7 upon the movement toward straight line position of a pair of toggle levers 14 arranged with their free extremities engaging the respective ends of the brake shoes and their other extremities pivoted to each other and to the yoke 15 by means of the pivot pin 16. As herein shown one toggle lever 14 is formed with a substantially spherical shaped head 14$^a$ on its free extremity seating in a cup shaped fulcrum block 17 mounted upon one extremity of the brake shoe, while the free extremity of the other toggle lever is preferably bifurcated, as at 14$^b$, and provided with slots 18 at the extremities of the furcations in which is received the fulcrum pin 19 mounted in a cross bar 19$^a$ carried by the side ribs 10 of the opposite extremity of the brake shoe. By virtue of this arrangement the free extremities of the toggle levers seat upon the opposite extremities of the brake shoe so as to exert pressure thereagainst regardless of the relative positions of the toggle levers, the spherical head 14$^a$ and the slotted bifurcations 14$^b$ pivoting upon the fulcrum seat 17 and fulcrum pin 19 respectively during the movements of the toggle levers. The yoke 15 may also be provided with a spherical head 20 adapted to seat within a cup 21 carried by the piston 22, which piston is fitted within the cylinder 23 so as to slide within the cylinder under the impulse of the hydraulic actuating mechanism, as hereinafter described. The cylinder 23 also serves as an anchor pin for limiting the contractile movements of the brake shoe away from the brake drum. As shown the cylinder 23 extends through an aperture in the face plate 13 and is secured in a bracket 24 riveted upon the face plate, as shown in Figs. 2 and 3, the inner extremity of the cylinder projecting inwardly of the bracket 24 and being threaded to receive the cylinder head 25. The cylinder head may be threaded upon the cylinder for a sufficient distance to compress a suitable packing 26 and may be then firmly locked in position by the set screw 27 extending through an ear on the piston head and threading into the bracket 24. The longer axis of the cylinder 23 extends at right angles to the direction of movement of the free ends of the brake shoe and also at right angles to the toggle levers utilized to transmit power from the piston 22 to the brake shoe, the outer portion of the cylinder projecting across the brake drum between the free extremities of the brake shoe and carrying at its outer extremity a brake shoe limiting member 28. As best shown in Fig. 2 the limiting member 28 is secured, as by the set screw 29, to a cross bar 30 arranged within a pair of elongated slots 31 in the outer portion of the cylinder. The toggle levers 14 are adapted to extend through the slots 31, substantially as shown, while the extremities of the brake shoe normally engage the cylinder adjacent the extremities of the slots 31.

As can best be seen in Figures 2 and 3, the set screw 29 also acts as a limiting member, serving to control the extent of travel of the toggle levers 14 regardless of the pressure applied thereto, thereby preventing accidental movement of the toggle levers beyond a straight line position.

Means may be provided for permitting the adjustment of the effective length of the brake shoe. In the illustrated embodiment I have shown a simple and effective means of adjusting the position of the seat 17 upon the brake shoe 8, and accordingly, adjusting the initial position of the brake shoe relatively to the brake drum 7. The cup-shaped seat 17 is formed with a curved shank 17$^a$ (note Fig. 5) having its rear extremity beveled, as at 17$^b$, for engagement with the wedge 32 arranged with its inclined face in engagement with the beveled portion 17$^b$ and its opposite extremity contacting the web 33 connecting the rear extremities of the spaced lugs 34 extending radially inward from the brake shoe. A pair of aligned slots 35 are arranged in the lugs 34 for the passage of the wedge 32 and an adjusting screw 36 is threaded into the wedge and having its head extending laterally beyond the lugs 34 for convenient turning by a wrench or other suitable tool. A washer 37 is preferably interposed between the head of the bolt 36 and the adjacent lug 34, the washer being of greater diameter than the width of the slot 35. The shank 17$^a$ of the cup-shaped seat 17 is also slotted, as at 38, to permit the passage of a bolt 39 extending through the lugs 34 adjacent their upper extremities and serving to brace the lugs 34 while permitting longitudinal movement of the cup-shaped seat. When the adjusting screw 36 is turned in the proper direction, the wedge 32 will be drawn laterally across the web 33, and in so doing will tend to slide the shank 17$^a$ and seat 17 toward the anchor pin 23, but since the seat 17 firmly contacts the anchor pin so as to resist movement in this direction the resultant action will be the movement of the web 33 and the brake shoe outwardly toward the brake drum 7, thereby adjusting the initial position of the brake shoe relatively to the brake drum against the tension of the coil spring 40 arranged between one of the webs 34 and a lug 41 fixed upon the face plate 13, substantially as shown in Fig. 1. Of course, when the adjusting screw 36 is turned in the opposite direction the extremity of the brake shoe 8 will be moved inwardly away from the brake drum through the medium of the coil spring 40, which takes up any space between the inclined surface of the wedge 32 and the beveled face 17$^b$ of the shank. A coil spring 42 is also preferably arranged between the lug 41 and a lug 43 carried by the opposite extremity of the brake shoe to normally maintain that extremity of the brake shoe in contact with the anchor pin 23.

The piston 22 is adapted to be reciprocated within the cylinder 23 by the force exerted through the hydraulic actuating mechanism or the power of the springs 40 and 42 respectively. Thus, when a liquid under pressure is forced into the inner extremity of the cylinder 23, the piston is moved outwardly, and in such movement forces apart the extremities of the brake shoe against the tension of the springs 40 and 42. Then when the pressure on the liquid is released, these springs pull the extremities of the brake shoe back to their original positions, and in so doing force the toggle levers 14 to slide the piston 22 inwardly to expel the liquid then within the cylinder 23. Any suitable means may be employed for transmitting the hydraulic pressure to the several cylinders 23. A number of operative constructions are on the market for forcing liquid under pressure from a central reservoir to the brakes of the several wheels of an automobile, and, since my invention does not reside in this portion of the brake actuating mechanism, no attempt has been made to illustrate any particular means of producing the necessary hydraulic power. In Fig. 7 I have shown a flexible tube 44 connected at one extremity with the inlet connection 45 carried by the cylinder head 25 and supported upon the chassis 5, the opposite end of the tube 44 being intended to be connected with the reservoir.

Sufficient liquid is preferably employed to always fill the tubes 44 and have some liquid remaining in each cylinder 23 when the brake shoes are out of engagement with the brake drums. A bleeder port 46 may be arranged upon the upper extremity of the cylinder heads 25 to permit the escape of air from within the cylinders and tubes when the liquid is first forced into its normal position throughout the actuating mechanism when the bleeder port 46 is used, as during the filling of the system with oil or other fluid, the plug in the opening 46 is removed. When the system is full of the fluid, the plug is replaced in the port 46.

The interior of each cylinder 23 may be machined to co-operate with its piston 22, and a packing cup 22a fixed upon the head of the piston to prevent the leakage past the piston of the actuating fluid within the cylinder. Or I may provide a separate lining 47 of suitable wear and corrosion resisting material, and arrange such lining within the inner portion of the cylinders 23 substantially as shown in Figs. 2 and 3. The inner wall of the liner should be machined to snugly receive its piston 22, and a similar packing cup 22a, of rubber or other suitable material, should so fit within the liner as to prevent leakage of the hydraulic fluid past the piston. It will be apparent that this construction is well adapted to continued operation of the brakes and economic assembly and servicing. Thus if the liner 47 should become scored or otherwise incapacitated for further service, or should the packing cup 22a or other portion of the piston become incapacitated, it is possible with my construction to quickly remove the defective portions and substitute new ones without requiring the removal of the wheel from the vehicle. By removing the cylinder head 25 from the inner extremity of the cylinder 23 access may be had to the interior of the cylinder, and the liner 47 or the packing cup 22a may be readily withdrawn and another substituted from the inner side of the brake. The cylinder head may then be replaced, and the bleeder port 46 opened until the cylinder is again filled with the hydraulic fluid, whereupon the brake is again ready for operation.

It is also easy to service the remaining portions of my brake mechanism from the outer side of the brake. When the wheel and drum are removed access is given to the adjusting bolt 36, and such other parts of the apparatus as are liable to wear.

In Fig. 8 I have illustrated an embodiment wherein the actuating liquid does not contact the operating pistons of the several brakes. Instead a diaphragm 50, of rubber or other suitable material, is arranged between each piston and the adjacent cylinder head, being preferably clamped into position between the cylinder head and the inner extremity of the cylinder, substantially as shown in Fig. 8. By providing a bead 51 at the edge of the diaphragm, and compressing such bead when the cylinder head is positioned, I am enabled to secure a packing that will prevent leakage of the actuating liquid. The central portion of each diaphragm 50 contacts the inner extremity of its piston so that whenever the liquid is forced into the cylinders the resultant extension of the diaphragms will force the pistons outwardly to move the toggle levers toward straight line positions, and so throw the extremities of the brake shoe into engagement with the brake drum. This movement of the brake shoe extends the springs 40 and 42, and when the pressure on the actuating liquid is removed, the return of such springs to their normal position will serve to withdraw the brake shoe from its engagement with the brake drum, force the toggle levers and piston toward normal position and expel the liquid from the several cylinders.

It will be noted that the arrangement of the piston and toggle lever is such that the proper extremity of the brake shoe will be forced into engagement with the brake drum regardless of the direction of rotation of the brake drum. The thrust imparted to the toggle levers will be transmitted in greater degree to that extremity of the brake shoe that is free to move with the brake drum, since the toggle levers will fulcrum on either the seat 17 or the fulcrum pin 19 when one extremity of the brake shoe is offering resistance to a greater degree than the other extremity of the brake shoe and further thrust imparted by the piston will be taken up entirely by the extremity of the brake shoe then free to move. Moreover, I preferably arranged the cross bar 19a carrying the fulcrum pin 19 so that it may pivot within the sides of the brake band 8, with the result that a universal joint effect is secured at this extremity of the brake shoe, the cross bar 19a rotating to accommodate movements in a vertical direction while the adjacent toggle lever may turn upon the fulcrum pin 19 to accommodate movements in a horizontal direction. The ball and socket arrangement in the opposite extremity of the brake shoe will, of course, also provide for universal movement.

Figures 5, 6:
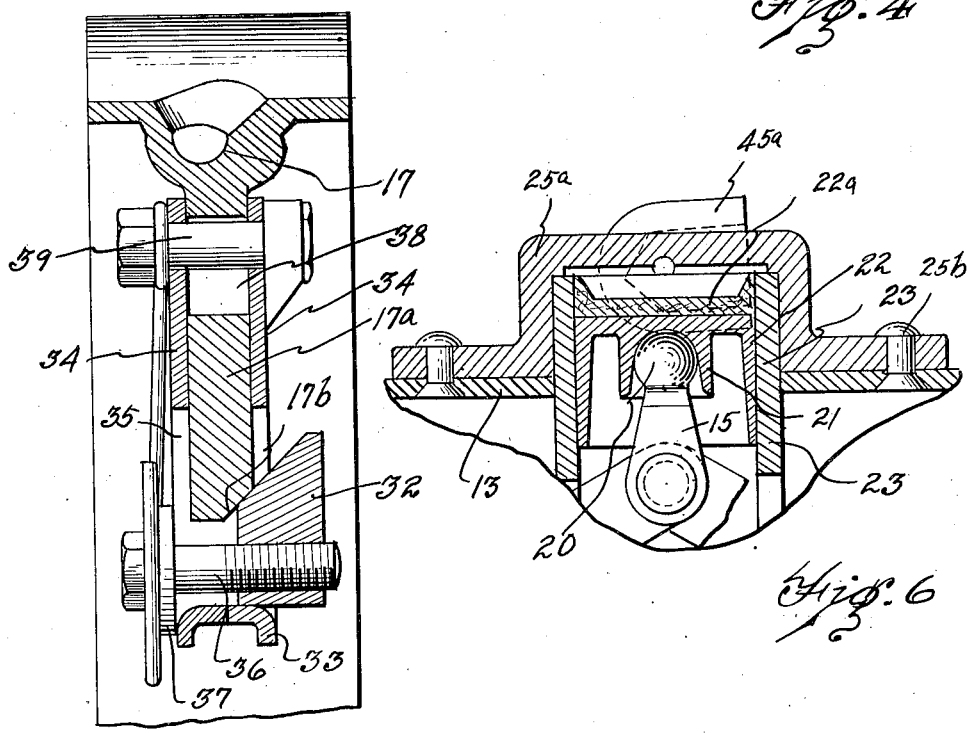
Fig. 5 is an enlarged detail view taken substantially on the line 5—5 of Fig. 1.
Fig. 6 is a detail view of the piston and cylinder, showing a slightly modified embodiment of the manner of enclosing the pistons.

In Fig. 6 is shown a manner of mounting the piston head directly to the cover plate 13 without the interposition of a bracket. The cylinder head 25a is machined to receive the inner extremity of the cylinder 23 and carries the hose connection 45a for junction with the hydraulic actuating mechanism. Suitable means, as the rivets 25b, may be employed for securing the cylinder head in position.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim

1. The combination with a wheel having a brake drum, of a cylinder arranged at substantially right angles to the plane of rotation of the drum, a piston, a brake shoe comprising a divided annulus, connections between the piston and the ends of the brake shoe whereby the brake shoe is thrown into and out of engagement with the brake drum when the piston is moved, and hydraulic actuating means for moving the piston, the cylinder also serving to limit the movements of the brake shoe away from the brake drum.

2. The combination with a wheel having a brake drum, of a cylinder arranged substantially parallel with the axis of the wheel, a piston reciprocable in the cylinder, a brake shoe, toggle levers arranged substantially perpendicular to the axis of the wheel and connecting the piston and brake shoe, and hydraulic actuating means for moving the piston, the cylinder being provided with diametrically opposed slots through which the toggle levers extend.

3. The combination with a wheel having a brake drum, of a brake band formed as a divided annulus having spaced extremities, a cylinder arranged at substantially right angles to the plane of rotation of the brake drum and between the extremities of the brake band to serve as an anchor therefor, a piston reciprocable within the cylinder, connections between the piston and the extremities of the brake band, and hydraulic actuating means for moving the piston.

4. The combination with a wheel having a brake drum, of a brake band having spaced extremities, a cylinder arranged between the extremities of the brake band to serve as an anchor therefor, a piston reciprocable within the cylinder, toggle levers connecting the piston and the extremities of the brake band, and hydraulic actuating means for moving the piston.

5. The combination with a wheel having a brake drum, of a brake band having spaced extremities, a cylinder arranged between the extremities of the brake band to serve as an anchor therefor, a piston reciprocable within the cylinder, toggle levers connecting the piston and the extremities of the brake band, and hydraulic actuating means for moving the piston, the cylinder being provided with lateral slots through which the toggle levers extend.

6. The combination with a wheel having a brake drum, of a brake band formed as a divided annulus and normally spaced from the inner periphery of the brake drum, an apertured face plate arranged to substantially close the open face of the brake drum, a cylinder extending through the aperture of the face plate between the extremities of the brake band, providing an anchor for the extremities of the brake band, a piston reciprocable within the cylinder, connections between the piston and the extremities of the brake band, and hydraulic actuating means for moving the piston.

7. The combination with a brake drum, of a brake band formed as a divided annulus and normally spaced from the inner periphery of the brake drum, an apertured face plate arranged to substantially close the open face of the brake drum, a cylinder extending through the aperture of the face plate between the extremities of the brake band, a piston reciprocable within the cylinder, connections between the piston and the extremities of the brake band, and hydraulic actuating means for moving the piston, the cylinder being provided with spaced lateral slots through which said connections extend.

8. The combination with a wheel having a brake drum, of a brake band formed as a divided annulus and normally spaced from the inner periphery of the brake drum, an apertured face plate arranged to substantially close the open face of the brake drum, a cylinder extending through the aperture of the face plate between the extremities of the brake band, a piston reciprocable within the cylinder, toggle levers connecting the piston and the extremities of the brake band, hydraulic actuating means for moving the piston, and universal joint connections between the outer extremities of the toggle levers and the extremities of the brake shoe so as to permit universal movement therebetween.

9. The combination with a wheel having a brake drum, of a brake band formed as a divided annulus normally spaced from the brake drum, a cylinder arranged between the extremities of the brake band and limiting the movement of the extremities of the brake band toward each other, said cylinder being provided with lateral apertures, a piston reciprocable within the cylinder, toggle levers connected at their inner extremities with the piston and extending through said cylinder apertures into engagement with the extremities of the brake band, and hydraulic actuating means for moving the piston within the cylinder.

10. The combination with a wheel having a brake drum, of a brake band formed as a divided annulus normally spaced from the brake drum, a cylinder arranged between the extremities of the brake band and limiting the movement of the extremities of the brake band toward each other, said cylinder being provided with lateral apertures, a piston reciprocable within the cylinder, toggle levers connected at their inner extremities with the piston extending through said cylinder apertures into engagement with the extremities of the brake band, hydraulic actuating means for moving the piston within the cylinder, and universal joint connections between the outer extremities of the toggle levers and the extremities of the brake band so that either lever may fulcrum on one extremity of the brake band offering the greater resistance, whereby continued thrust due to movement of the piston would be imparted solely to the extremity of the brake band offering the lesser resistance to movement.

11. The combination with a wheel having a brake drum, of a brake band formed as a divided annulus normally spaced from the brake drum, a cylinder arranged between the extremities of the brake band and limiting the movement of the extremities of the brake band toward each other, said cylinder being provided with lateral apertures, a piston reciprocable within the cylinder, toggle levers connected at their inner extremities with the piston and extending through said cylinder apertures into engagement with the extremities of the brake band, and hydraulic actuating means for moving the piston within the cylinder, one extremity of the brake band carrying an adjustable seat for its toggle lever.

12. The combination with a wheel having a brake drum, of a brake band formed as a divided annulus normally spaced from the brake drum, a cylinder arranged between the extremities of the brake band and limiting the movement of the extremities of the brake band toward each other, said cylinder being provided with lateral apertures, a piston reciprocable within the cylinder, toggle levers connected at their inner extremities with the piston and extending through said cylinder apertures into engagement with the extremities of the brake band, and hydraulic actuating means for moving the piston within the cylinder, one of said toggle levers having its outer extremity slotted, and a fulcrum pin mounted upon one extremity of the brake band and fitting into the slotted portion of said toggle lever.

13. The combination with a wheel having a brake drum, of a brake band formed as a divided annulus normally spaced from the brake drum, a cylinder arranged between the extremities of the brake band and limiting the movement of the extremities of the brake band toward each other, said cylinder being provided with lateral apertures, a piston reciprocable within the cylinder, toggle levers connected at their inner extremities with the piston and extending through said cylinder apertures into engagement with the extremities of the brake band, and hydraulic actuating means for moving the piston within the cylinder, one of said toggle levers having its outer extremity slotted, and a cross bar rotatably mounted within one extremity of the brake band and a fulcrum pin carried by the cross bar and fitting in the slotted portion of said toggle lever.

14. The combination with a wheel having a brake drum, of a brake band normally spaced from the inner periphery of the brake drum, an apertured face plate arranged to substantially close the open face of the brake drum, a cylinder extending through the aperture of the face plate and having spaced apertures in its wall, a piston reciprocable within the cylinder, links extending through the apertures in the cylinder wall and connecting the piston with the extremities of the brake band, a cylinder head secured over the inner extremity of the cylinder and carrying a hose connection, and hydraulic actuating means connected with the hose connection of the cylinder head for moving the piston within the cylinder.

15. In combination with a vehicle wheel and a brake drum rotatable therewith, friction means movable into and out of engagement with the brake drum, actuating means for controlling the movements of said friction means, including a pair of toggle levers, and an adjustable member arranged for limiting the movement of the toggle levers beyond a straight line position.

16. In combination with a vehicle wheel and a brake drum rotatable therewith, friction means movable into and out of engagement with the brake drum, actuating means for controlling the movements of said friction means, including a pair of toggle levers, and means arranged to be engaged by the toggle levers for limiting the movement of the actuating means.

17. In combination with a vehicle wheel and a brake drum rotatable therewith, friction means movable into and out of engagement with the brake drum, actuating means for controlling the movements of said friction means, including a pair of toggle levers, and a set screw arranged to be engaged by the toggle levers for limiting the movement of the actuating means.

18. In combination with a vehicle wheel, a brake drum rotatable therewith and being open at one side, an apron plate substantially closing the open side of the brake drum, friction means movable into and out of engagement with the brake drum, actuating means for controlling the movements of said friction means, and means carried by said apron plate and extending within the drum for engagement by the actuating means to limit the movement of the actuating means.

19. In a friction brake, a substantially cylindrical brake drum, a friction braking structure arranged adjacent the drum and movable into engagement therewith, said braking structure having adjoining terminal portions circumferentially spaced to form a gap therebetween, hydraulic means for moving the braking structure into engagement with the drum, including a cylinder so disposed that its axis is substantially parallel to that of the drum and arranged in the gap between the spaced ends of the braking structure, whereby the wall of the cylinder serves as a stop to limit movement of the braking structure.

20. In a friction brake, a substantially cylindrical brake drum, a friction braking structure arranged adjacent the drum and movable into engagement therewith, said braking structure having adjoining terminal portions circumferentially spaced to form a gap therebetween, hydraulic means for moving the braking structure into engagement with the drum, including a fluid-actuatable piston, a cylinder slidably housing the piston and so arranged partially between the spaced ends of the braking structure that a wall of the cylinder serves as a stop adapted to prevent undesired movement of the braking structure, each of said opposed ends of the braking structure being contoured conformably to the shape of the portion of the cylinder it abuts.

JOHN SNEED.